Figure 1:
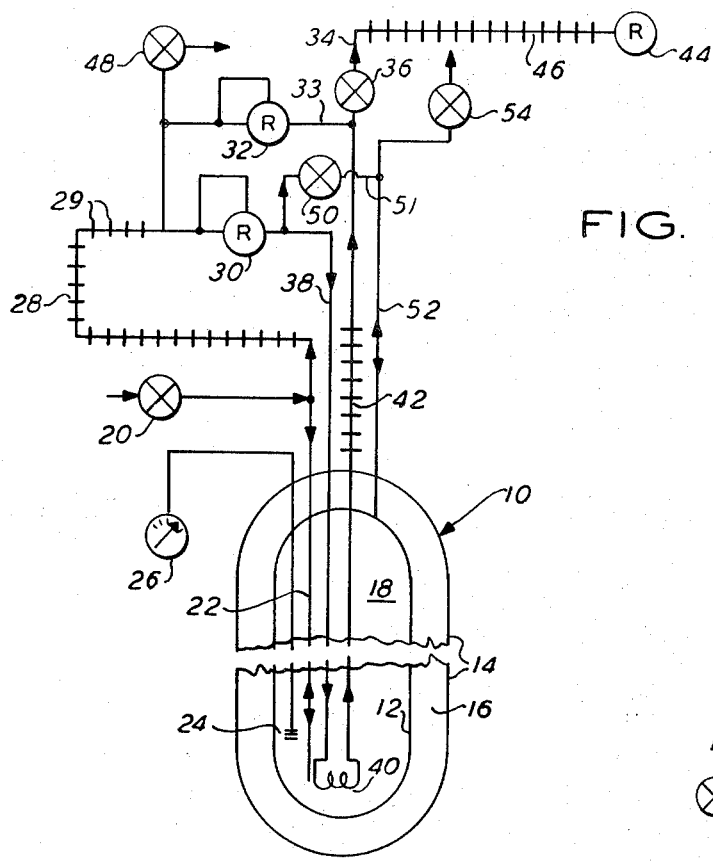

United States Patent [19]

Moen et al.

[11] 3,827,246

[45] Aug. 6, 1974

[54] PRESSURE CONTROL SYSTEM FOR CRYOGENIC FLUIDS

[75] Inventors: Walter B. Moen, Berkeley Heights; George R. Spies, Murray Hill, both of N.J.

[73] Assignee: Airco, Inc., New York, N.Y.

[22] Filed: Nov. 3, 1971

[21] Appl. No.: 195,512

Related U.S. Application Data

[62] Division of Ser. No. 777,048, Nov. 19, 1968, Pat. No. 3,650,290.

[52] U.S. Cl. ................................................ 62/50
[51] Int. Cl. ............................................ F17c 7/02
[58] Field of Search ............................ 62/52, 50, 49

[56] References Cited
UNITED STATES PATENTS 3,062,017  11/1962  Balcar et al. ............................ 62/50
3,097,497  7/1963  Fitt ........................................ 62/52

*Primary Examiner*—Meyer Perlin
*Assistant Examiner*—Ronald C. Capossela
*Attorney, Agent, or Firm*—David L. Rae; H. Hume Mathews; Edmund W. Bopp

[57] ABSTRACT

Heat for maintaining operating pressure in a single phase cryogenic fluid at or above the critical pressure is provided by controllably circulating a portion of the warmed delivery fluid in heat exchange with the storage fluid. The circulated delivery fluid is reheated and recombined with the remainder of the delivery fluid. A regulator device having a double acting valve element movable between two opposite positions controls flows respectively to a pressurizing heat exchanger coil and to a by-pass leading directly to delivery.

9 Claims, 2 Drawing Figures

PATENTED AUG 6 1974  3,827,246

PRESSURE CONTROL SYSTEM FOR CRYOGENIC FLUIDS

This is a Division of copending application Ser. No. 777,048, filed Nov. 19, 1968 for PRESSURE CONTROL SYSTEM FOR CRYOGENIC FLUIDS, NOW U.S. Pat. No. 3,650,290.

The present invention is concerned particularly with systems for the storing and dispensing the cryogenic fluids of the type disclosed in the Balcar et al U.S. Pat. No. 3,462,017. Such systems store cryogenic substances such as oxygen, nitrogen, etc., in a single phase at or above the critical pressure of the fluid. This system permits the storage of a maximum quantity of fluid for a given weight of container since it is possible thereby to place the greatest density of fluid into the container for the weight required to withstand the corresponding pressures. Further by storage of the fluid in single phase, it is possible to withdraw and deliver the fluid when normal gravitational forces such as are required for operation of two phase liquid storage systems, are not fully effective. This occurs, for example, in space. Conditions under which the normal influence of gravity is critically related to the dispensing of the fluid occur also in air travel or undersea exploration. In these situations the storage container may be subjected to various orientations while in use. As a result a continuous delivery of either the liquid or the gas is not assured and the dispensing of the fluid is interfered with. In a supercritical storage system of the type shown in the Balcar et al Patent, the single phase fluid may be readily withdrawn without dependence on the gravitational environment.

Aside from use of single phase storage of fluids to overcome adverse gravitational considerations, such utilization is often a necessity with certain cryogenic fluids having relatively low critical pressures and critical temperatures and a narrow spread between critical temperature and normal boiling point. Fluids having extremely low critical temperatures and pressures, such as helium, ordinarily cannot be maintained readily below the critical temperature or the critical pressure and cannot be effectively dispensed even at low pressures using conventional systems dependent upon two fluid phases. In these cases, a single phase dispensing system is necessary. In addition, heat is required with such fluids to raise the operating pressure substantially above its low critical pressure in order to dispense the fluid against relatively high environments absolute pressures such as in the case of undersea use requiring increasingly higher pressures for greater working depths.

In order to maintain effective operating pressure during withdrawal of the single phase fluid, heat must be supplied to the storage fluid. Systems such as have been applied heretofore for the maintenance of operating pressure in two phase systems, i.e., liquid and gas, are not applicable to single phase type systems. In general, the earlier pressure controlling arrangements have inherently depended upon the existence of the liquid phase for operation. In single phase systems with which the present invention is concerned, there is of course, no such liquid phase and consequently, it is necessary to develop an effective and unique system which is specifically related to and effective for the maintenance of pressure in such type systems without regard to gravitational environment. In the Balcar et al Patent, a system for imparting heat to a single phase system is shown. However, it does not satisfy a number of practical requirements to which such dispensing apparatus is subjected. In the system disclosed, for example, a heater element operated by a thermally responsive switch is operated intermittently to control the heating of the delivery fluid that is circulated through a coil in heat exchange relation with fluid in the vessel. Such a type of electrical heater, however, is impractical and restrictive in many applications. For example, it requires a source of electric heat always available in conjunction with the vessel and dispensing system. This obviously could be extremely cumbersome if not entirely precluded where the vessel is intended to be portable, such as where it is used by a diver undersea. Furthermore, the switch mechanism itself which depends on solenoid or similar valve means affords a potential source of difficulty since it represents mechanism disposed externally of the fluid circuit.

Accordingly, it is the principal object of the present invention to provide a storage and dispensing system for cryogenic fluids maintained at supercritical pressure, which is operable independently of gravitational influences, wherein a portion of the delivery fluid is controllably circulated in heat exchange relationship with the contents of the vessel to maintain the desired operating pressure.

It is a further object of the invention that such means for heating the contents of the vessel to maintain this operating pressure may be independent of sources of electrical heating power and can employ instead environmental heat as a source for heating the fluid.

It is a still further object of the present invention to provide such a system wherein the heat imparted to the vessel contents for such purpose be controlled by effectively proportioning the flow or quantity of delivery fluid circulated through heat exchanger means for that purpose.

It is a still further object of the present invention to provide a novel regulator device suitable for effecting such control and for obtaining the necessary proportioning of the circulating fluid by means of a double acting valve element which proportions the flow of delivery fluid to a heat exchanger means within the vessel and to a by-pass going directly to the delivery outlet.

Figure 2:
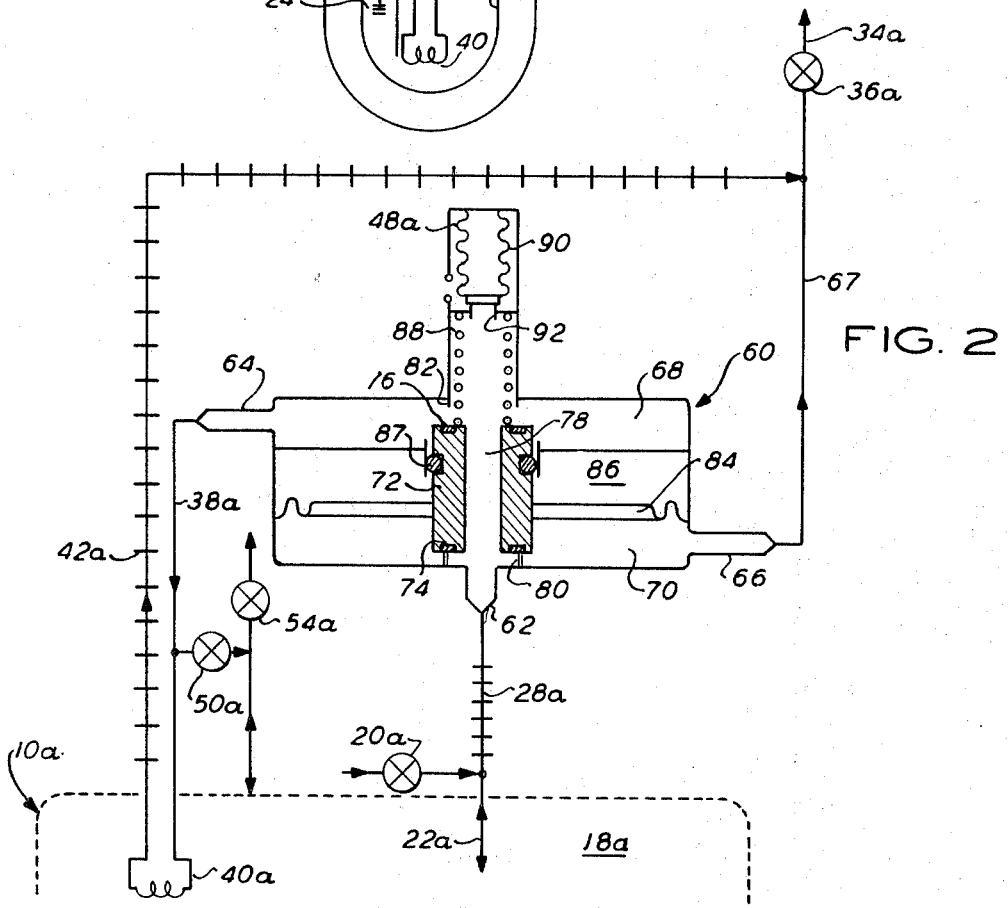

A fuller understanding of the invention together with other of its objects and advantages may be had by reference to the following description and the accompanying drawings in which;

FIG. 1 is a schematic representation of a cryogenic fluid container and associated dispensing controls and delivery lines and FIG. 2 is a schematic view showing portions of the cryogenic container and associated delivery lines of a highly advantageous regulating device for controlling the circulation of fluid for maintaining pressure in the container.

Referring to FIG. I, the numeral 10 refers to a cryogenic vessel of the so-called Dewar type which has an inner vessel 12 within an outer vessel 14 so as to provide between them an evacuated space 16. In normal practice wrappings of reflective material may be wound on the inner vessel to impede the passage of heat due to radiation and, finely particulated material such as activated charcoal may be placed in the evacuated space to act as a getter which absorbs residual gas and aids in effectively maintaining a high vacuum. The chamber 18 within the inner vessel receives the cryogenic fluid to be maintained under appropriate pressure at the time of dispensing. The chamber 18 is normally charged with fluid as liquid through a suitable filling valve such as shown at 20 and line 22. This same line 22 when the filling valve 20 is closed, as will be hereinafter described, also serves as the discharge line through which the cryogenic fluid is dispensed from the vessel. A thermocouple shown at 24 is located within the chamber 18 and by conventional means operates a temperature gauge 26 mounted or otherwise positioned externally of the vessel to indicate the temperature of the contents. The temperature reading of the guage 26 as described in the Balcar et al U.S. Pat. No. 3,062,017 shows by appropriate calibration the quantity of cryogenic material within the container. This is related to the fact that at a constant operating pressure, the density of the fluid within the container progressively decreases as fluid is withdrawn. Correspondingly, the temperature of the fluid must be gradually increased to maintain the operating pressure while the density is decreasing. Consequently calibration is possible showing at any particular reading of the temperature gauge the quantity of fluid remaining in the vessel.

The discharge line 22 externally of the vessel 10 connects with a preheater coil 28. This coil may be of any suitable design effective to heat the fluid therein by absorption of heat. Such coil, for example, may utilize a series fins 29 to enchance the thermal exchange from the surrouding environment. Alternatively a source of heat may be provided for absorption in the coil. A pair of regulators 30 and 32 are connected at the downstream side of the coil 28. The regulator 32 discharges through by-pass conduit 33 directly to discharge line 34. An outlet valve 36 is operable to open or close the line 34. The regulator 30 provides an alternate path of flow through line 38 to a heat exchanger coil 40 within the chamber 18, thence through reheating coil 42 to the discharge line 34. The regulator 30 serves as a pressure controller which controls the flow of a divided portion of delivery fluid through heat exchanger 40 to heat the single phase contents of chamber 18 when it is necessary to increase the pressure. The regulator 32 serves as a by-pass which permits fluid from the preheating coil 28 to pass directly to the discharge line 34, by-passing the path leading through the heat exchanger coil 40. By appropriate settings of the regulators 30 and 32, they function cooperatively such that the delivery fluid is constantly proportioned between the coil 40 and the by-pass to maintain the desired operating pressure.

The regulators 30 and 32 utilize upstream pressurized fluid to load a diaphragm control element in a manner that is well-known in the art. Assuming for example, that the vessel 10 is intended to operate at a pressure range of approximately 800–1,000 psia, the regulator 30 may be adjusted to be fully opened at 800 psia and fully closed at 1,000 psia. The regulator 32 on the other hand, may be so adjusted as to be fully closed at 800 psia and fully open at 1,000 psia. It will thus be seen that when the pressure of the cryogenic fluid in chamber 18 is at or below the level of 800 psi, the fluid withdrawn from the chamber upon opening the discharge valve 36 will flow entirely through the the regulator 30 and exchanger 40 in which heat imparted by preheater coil 28 is applied to the contents of the chamber to increase the pressure therein. As pressure begins to increase to a level above 800 psi, the operation of regulator 32 will cause a suitable proportion of the fluid coming from the coil 28 to by-pass the heat exchanger 40 and pass directly to the discharge line 34 where it is combined with the portion of the fluid that continues to be delivered through the heat exchanger 40. The two regulators will then cooperate so as to deliver to the exchanger 40 whatever portion of the fluid is necessary to maintain the pressure within the range of 800 to 1,000. It will be seen as the pressure increases still further, the regulator 30 would be progressively closed so that in the event the upper desired limit of the pressure of the operating range is reached, the regulator 30 would be entirely closed and none of the fluid would be conducted to exchanger 40 to impart additional heat to the contents of the vessel. Consequently, as fluid continues to be withdrawn, the pressure in the chamber 18 tends to decrease until such time as the regulator 30 once more is caused to open and deliver additional pressure building heat to the vessel.

The reheat coil 42 is intended to impart to the fluid that has passed through the exchanger 40 substantially that amount of heat which has been withdrawn from the fluid in heating the contents of the vessel. Consequently, the fluid, after passing through the reheat coil 42, is at a temperature comparable to that of the fluid that passes directly to the discharge line 34 through the by-pass regulator 32.

Depending upon the particular application in which the vessel 10 is to be used, there may be placed downstream of the discharge valve 36, a regulating device which is effective to reduce the pressure of the fluid from the operating pressure of the chamber 18 to some lower pressure. In the case, for example, of use for undersea diving, this may be a depth responsive regulator which is arranged to reduce the pressure to a level having a predetermined differential from the ambient pressure of the surrounding sea. This will vary of course according to the depth at which the diver may be working. Such a regulator, for example, might be arranged as shown at 44. A coil 46 is arranged to heat the delivery fluid to substantially ambient temperatures to enhance the operation of regulator 44 such as by preventing freezing and to permit comfortable inhalation when the fluid is used for respiration. There may be connected to the discharge end of the regulator 44 any other valve or regulator means adopted for use of the fluid. In the case of delivering oxygen for breathing purposes, a conventional breathing demand regulator could be employed.

In order to avoid inadvertent over pressurization of the fluid container, a pressure relief valve is provided in communication with the chamber 18. This valve shown at 48 is connected to the discharge end of the preheater coil 28 which thereby maintains the relief valve in direct communication with the interior or the vessel through the line 22. However, such valve can be connected in any convenient manner.

Under normal conditions, the vessel 10 is filled to a predetermined extent with cryogenic fluid at substantially lower pressure than its normal operating pressure. In this manner, the cryogenic fluid can be stored for a long period before the pressure within the chamber rises to a point that may necessitate the venting of the fluid to avoid over pressurization. In the event that it is desired to place the vessel in operation before the chamber pressure has risen to intended operating pressure, means are provided to enable the pressure to be rapidly increased to such level. Such means includes a preheat valve 50 which is connected to the outlet of the pressure building regulator 30. The valve 50 connects directly with the chamber 18 through a line 52. It will be seen that by opening the valve 50, a continuous flow passage is formed through the line 22, coil 28, regulator 30 (which is open inasmuch as the pressure within the chamber 18 is below the normal operating pressure) valve 50, line 51, and line 52. In the actual construction of the system herein shown schematically, coil 28 is positioned at the bottom of the vessel 10 when the system is in the vertical position so that this open circuit forms a thermosyphon in which the fluid from the container becomes heated in coil 28 and by convection results in a thermosyphon effect that circulates fluid from the chamber 18 through the coil 28 and back to the chamber. By warrent of this effect the heating of the fluid in the coil 28 progressively warms and increases the temperature within the chamber 18 until the desired operating pressure is achieved. At this point, the discharge valve 36 is opened and the vessel 10 can be placed in operation. For convenience, the line 52 may be connected with a valve 54 which serves, when opened, to permit the venting of gas in the chamber 18 when fluid is being introduced to the filling valve 20. After filling and during the period of storage and operation this valve is closed.

An alternative embodiment of the invention combining into one element, regulators 30 and 32 is shown in FIG. 2 of the drawing. In this drawing, the equivalent parts of the apparatus have been identified by the letter a and the same numeral as in FIG. 1. This the cryogenic vessel equivalent to that shown at 10 in FIG. I is indicated at 10a in FIG. 2 and so on. The chamber 18a contains the cryogenic fluid to be dispensed. A control regulator device 60 is provided to control the delivery of fluid from the container 18a and to regulate the circulation of fluid through the heat exchanger coil 40a within the chamber 18a and thereby maintain the desired operating pressure. Regulator 60 is essentially the functional counterpart of the regulators 30 and 32 of FIG. I. The regulator 60 has an inlet connection 62 to which the fluid from the chamber 18 is delivered through the line 22a and preheating coil 28a. An outlet connection 64 delivers fluid through the heat exchanger 40a, thence reheat coil 42a to the discharge valve 36a. An outlet 66 delivers fluid directly to the discharge valve 36a.

The housing of regulator 60 has a chamber 68 which communicates with the outlet 64 and a chamber 70 which communicates with the outlet 66. A reciprocating valve element 72 has valve seats 74 and 76 in its opposite end faces and a central bore 78 which communicates with openings in the ends of the element surrounded by the valve seats 74 and 76. The valve seats 74 and 76 are arranged to seat respectively against annular nozzles 80 and 82 which define the valve openings. The valve element is integrally mounted in a diaphragm 84 which divides chamber 70 from a chamber 86 and is subject to pressure within the chamber 70 to displace the valve element. O-ring members 87 are disposed on the valve element to effectively seal the chamber 68 from the intermediate chamber 86. A spring 88 acts downwardly against the valve element 72 so as to close the valve nozzle 80 until a predetermined pressure exists in the chamber 70, causing the seat 74 to move away from seated position against nozzle 80.

It may be seen that when the pressure within the chamber 18a is below a predetermined value and seat 74 is closed, the pressure in chamber 18a extends to the chamber 70 through line 22a, inlet 62, passage 78, chamber 68, outlet 64, line 67, and outlet 66. The fluid, therefore, upon opening of the valve 36a will flow through line 22a, preheating coil 28a, inlet 62, bore 78 in the valve element into chamber 68, past the open valve seat 76, and thence through outlet 64 and heat exchanger coil 40a. Coil 40a then will cause heating of the contents of chamber 18a and an increase in chamber pressure. The fluid, after passing through the exchanger 40a, thence passes through the reheater coil 42a in which it is rewarmed to compensate for the heat withdrawn in the heat exchanger 40a as discussed in connection with FIG. 1. When the pressure has risen to a level sufficient for the pressure reflected in the chamber 70 and acting on the underside of diaphragm 84 to overcome the bias of the spring 88, the valve element will be unseated from the nozzle 80 thus permitting the fluid to flow from the inlet 62 directly to the chamber 70 and thence outlet 66, line 67 to the discharge valve 36a. Such fluid, therefore, by-passes the heat exchanger coil 40a. As the pressure rises from heating by coil 40a the valve element 72 will move further toward the nozzle 82 to reduce flow to the coil and will close completely when the operating pressure achieves a predetermined upper limit. The valve element will continue to be adjusted between its opposite positions against the nozzle openings 80 and 82 so that fluid entering the inlet 62 is proportioned between the outlets 64 and 66 of the regulator, causing only that amount of fluid to pass through the coil 40a necessary to maintain the desired operating pressure.

In this embodiment, a relief valve 48a is provided by means of a spring-loaded bellows 90 which acts against an opening 92 that communicates directly with the bore 78 of the valve element, thereby, maintaining constant and direct communication with the interior of the chamber 18a. The filling valve 20a operates in the same manner described in connection with FIG. 1. Similarly, a preheat valve 50a is connected in the line 38a and is operable to produce a thermosyphon effect as described in connection with FIG. I to increase the storage pressure of the container to operating level when it is desired to place the system in condition for operation.

It will, of course, be understood that the operating pressures employed in any installation will be a function of the particular fluid in use. For example, in the case of oxygen whose critical pressure is approximately 730 psia the operating pressure would normally be at least about 1 percent above its critical pressure. The operating range may extend from this pressure up to the maximum pressure required for a particular use. As a general rule 1,500 psia will suffice. Under such conditions the fluid within the chamber of the insulated vessel will consequently always be in the single phase and the apparatus will function independently of the orientation of the vessel or gravitational forces acting thereon.

Examples of other cryogenic substances which may be used advantageously in accordance with this invention and their critical pressures are as follows:

| | |
|---|---|
| Nitrogen | 493 psia |
| Argon | 710 psia |
| Helium | 33.2 psia |
| Hydrogen | 191 psia |
| Methane | 673 psia |

The range of operating pressures with which the present invention would generally be used is from about 1 percent above the critical pressure thereof to the maximum working pressure required for particular applications. Generally, pressures within the range up to 1,500 psia will be sufficient.

As previously mentioned, an advantage of the present invention, even if no significant gravitational problem exists, is in facilitating the operation of the dispensing system at adequately high pressures. For example, in the use of helium in undersea work, operating pressures of as high as 1,500 psia may be desired which is far above the critical pressure of helium. Input of heat sufficient to maintain the helium at such operating pressures is effectively accomplished in the manner hereinabove described.

The temperature of the fluid at the time of initial withdrawal will depend upon several factors including the initial filling density of the storage vessel, the operating pressure and the particular fluid. In the case of a vessel typically filled to 90% with liquid helium at 1 atmosphere, the temperature may be about −403°F, if it is desired to withdraw the helium at an operating pressure of about 1,500 psia, or about −450°F. at an operating pressure of about 35 psia. As quantities of the fluid are withdrawn, the temperature will be progressively increased and may reach normal atmospheric temperature or whatever temperature level is required to withdraw a specified amount of the contents from the storage vessel.

In general, the cryogenic substances with which the present invention is concerned, are utilized by maintaining a body of such substance at an extremely low temperature in a thermally insulated zone to which heat is controllably introduced as hereinabove described. For the purpose of this disclosure, a cryogenic substance may be regarded as a substance having a boiling temperature below −150°C.

It will be understood that changes may be made in the methods and apparatus set forth hereinabove without departing from the spirit of the invention or exceeding the scope thereof as defined in the following claims.

We claim:

1. A method of providing a continuous supply of a cryogenic substance in a single phase which comprises establishing a low temperature, single phase body of said substance in a thermally insulated zone above the critical pressure of said substance;
   withdrawing a stream of said substance in said single phase from said zone;
   heating said withdrawn single phase substance;
   conducting a first, controlled portion of said single phase substance in heat exchange relation with said substance in said zone to maintain the pressure of said substance at a predetermined operating level above the critical pressure of said substance; and
   conducting a second, remaining portion of said heated single phase substance to a discharge line.

2. A method according to claim 1 wherein said single phase body of said substance in said thermally insulated zone is maintained at an operating pressure in the range of from about 1 percent above the critical pressure to about 1,500 psia.

3. A method according to claim 1 wherein said cryogenic substance is oxygen.

4. A method according to claim 1 wherein said cryogenic substance is helium.

5. A method as defined in claim 1 wherein said step of conducting said first, controlled portion of said substance includes
   conducting said first, controlled portion away from heat exchange relation with said single phase substance in said zone;
   combining said first, controlled portion of said substance and said second, remaining portion; and
   conducting said combined first, controlled and second, remaining portions of said single phase substance to a discharge line.

6. A method as defined in claim 5 wherein said step of conducting said first, controlled portion away from heat exchange relation with said single phase substance in said zone includes
   reheating said first, controlled portion of said substance prior to combining said first, controlled and second, remaining portions of said single phase substance.

7. A method of providing a continuous supply of a cryogenic substance in a single phase comprising the steps of
   dividing a supply of said single phase substance into first and second portions;
   introducing said first portion of said single phase substance into a thermally insulated zone;
   heating said second portion of said substance;
   introducing said heated second portion of said single phase substance into said zone to increase the pressure of said single phase substance in said zone as said first portion is introduced into said zone thereby establishing a body of said single phase substance in said zone at a pressure above the critical pressure of said substance;
   withdrawing a stream of said substance in said single phase from said zone;
   heating said withdrawn single phase substance; and
   conducting a controlled portion of said heated single phase substance in heat exchange relation with said substance in said zone to maintain the pressure of said substance at a predetermined operating level above the critical pressure of said substance.

8. A method of providing a continuous supply of a cryogenic substance in a single phase which comprises establishing a low temperature, single phase body of said substance in a thermally insulated zone above the critical pressure of said substance;
   withdrawing a stream of said substance in a single phase from said zone;
   heating said withdrawn single phase substance;
   conducting a controlled portion of said heated single phase substance in heat exchange relation with said substance in said zone to maintain the pressure of said substance at a predetermined operating level above the critical pressure of said substance and regulating the amount of said single phase substance passed in heat exchange relation with said body in accordance with the pressure of said body of single phase substance in said zone.

9. A method as defined in claim 8 wherein the magnitude of said controlled portion of said single phase substance is increased in response to a decrease in the density of said single phase substance in said zone.

* * * * *